United States Patent [19]

Ryan

[11] Patent Number: 5,367,656
[45] Date of Patent: Nov. 22, 1994

[54] CONTROLLING CACHE PREDICTIVE PREFETCHING BASED ON CACHE HIT RATIO TREND

[75] Inventor: Charles P. Ryan, Phoenix, Ariz.

[73] Assignee: Bull HN Information Systems Inc., Billerica, Mass.

[21] Appl. No.: 850,713

[22] Filed: Mar. 13, 1992

[51] Int. Cl.⁵ .............................................. G06F 13/00
[52] U.S. Cl. .................................................... 395/425
[58] Field of Search ................................. 395/400, 425

[56] References Cited

U.S. PATENT DOCUMENTS

5,093,777 3/1992 Ryan ........................................ 395/400
5,285,527 2/1994 Crick et al. ............................. 395/425

FOREIGN PATENT DOCUMENTS

0402787 12/1990 European Pat. Off. ...... G06F 12/08

OTHER PUBLICATIONS

IBM Technical Disclosure Bulletin, vol. 30, No. 2, Jul. 1987 p. 510 "New Context Bit".
1987 IEEE International Conference on Computer Design Oct. 5-8, 1987; "Adaptive Cache Management" pp. 129-132.
European Search Report for corresponding EPO patent application 93 102 647.0, transmitted in a Communication dated Jun. 14, 1993.

Primary Examiner—David L. Robertson
Attorney, Agent, or Firm—J. S. Solakian; J. H. Phillips

[57] ABSTRACT

In a data processing system which employs a cache memory feature, a method and exemplary special purpose apparatus for practicing the method are disclosed to lower the cache miss ratio for called operands. Recent cache misses are stored in a first in, first out miss stack, and the stored addresses are searched for displacement patterns thereamong. Any detected pattern is then employed to predict a succeeding cache miss by prefetching from main memory the signal identified by the predictive address. The apparatus for performing this task is preferably hard wired for speed purposes and includes subtraction circuits for evaluating variously displaced addresses in the miss stack and comparator circuits for determining if the outputs from at least two subtraction circuits are the same indicating a pattern yielding information which can be combined with an address in the stack to develop a predictive address. The cache miss prediction mechanism is adaptively selectively enabled by an adaptive circuit that develops a short term operand cache hit ratio history and responds to ratio improving and ratio deteriorating trends by accordingly enabling and disabling the cache miss prediction mechanism.

19 Claims, 3 Drawing Sheets

CONTROLLING CACHE PREDICTIVE PREFETCHING BASED ON CACHE HIT RATIO TREND

FIELD OF THE INVENTION

This invention relates to the art of data processing systems which include a cache memory feature and, more particularly, to a method and apparatus for adaptively selectively predicting memory cache misses for operand calls and using this information to transfer data from a main memory to cache memory to thereby lower the cache miss ratio.

BACKGROUND OF THE INVENTION

The technique of employing a high speed cache memory intermediate a processor and a main memory to hold a dynamic subset of the information in the main memory in order to speed up system operation is well known in the art. Briefly, the cache holds a dynamically variable collection of main memory information fragments selected and updated such that there is a good chance that the fragments will include instructions and/or data required by the processor in upcoming operations. If there is a cache "hit" on a given operation, the information is available to the processor much faster than if main memory had to be accessed to obtain the same information. Consequently, in many high performance data processing systems, the "cache miss ratio" is one of the major limitations on the system execution rate, and it should therefore be kept as low as possible.

The key to obtaining a low cache miss ratio is obviously one of carefully selecting the information to be placed in the cache from main memory at any given instant. There are several techniques for selecting blocks of instructions for transitory residence in the cache, and the more or less linear use of instructions in programming renders these techniques statistically effective. However, the selection of operand information to be resident in cache memory at a given instant has been much less effective and has been generally limited to transferring one or more contiguous blocks including a cache miss address. This approach only slightly lowers the cache miss ratio and is also an ineffective use of cache capacity.

Thus, those skilled in the art will understand that it would be highly desirable to provide means for selecting operand information for transitory storage in a cache memory in such a manner as to significantly lower the cache miss ratio. That end was accomplished in accordance with the invention disclosed and claimed in U.S. patent application Ser. No. 07/364,943 filed Jun. 12, 1989, for CACHE MISS PREDICTION METHOD AND APPARATUS by Charles P. Ryan, now U.S. Pat. No. 5,093,777, by special purpose apparatus in the cache memory which stores recent cache misses and searches for operand patterns therein. Any detected operand pattern is then employed to anticipate a succeeding cache miss by prefetching from main memory the block containing the predicted cache miss.

It was determined, however, that under certain operating conditions, the full time use of the foregoing procedure can actually raise the long term miss ratio (i.e., lower the long term hit ratio). In a typical cache based processor that executes a single process during a given period, the cache hit ratio will stabilize after some time interval following the institution of the process. If a change to another process is made, new instructions and data must be loaded into the cache such that cache hit ratio instantaneously drops dramatically and then increases as the new process is "experienced". If the cache miss prediction mechanism is in operation, the initial rate of increase in the cache hit ratio is much faster. However, the hit ratio never reaches the level it would reach in the long term if the cache miss prediction mechanism was not in use. This result is caused by the fact that the cache miss prediction mechanism continues to find and load from main memory the next possible miss which, however, is not used, thus forcing the cache to replace blocks that are more important.

The invention disclosed and claimed in U.S. patent application Ser. No. 07/841,687 filed Feb. 26, 1992, for SELECTIVELY ENABLED CACHE MISS PREDICTION METHOD AND APPARATUS by Charles P. Ryan, overcomes the limiting effect of using the cache miss prediction mechanism continuously after a process has been changed by selectively enabling the cache miss prediction mechanism only during cache "in-rush" following a process change to increase the recovery rate; thereafter, it is disabled, based upon timing-out a timer or reaching a hit ratio threshold, in order that normal procedures allow the hit ratio to stabilize at a higher percentage than if the cache miss prediction mechanism were operated continuously.

There are operating conditions, however, under which it would be advantageous to have the cache miss prediction mechanism in operation even after cache inrush following a process change. An example of such an operating condition is when very large sets (even in excess of the cache size) of regularly addressed operand data (matrix/vector/strings) are used by a procedure.

OBJECTS OF THE INVENTION

It is therefore a broad object of this invention to provide an improved cache memory in a data processing system.

It is another object of this invention to provide a cache memory particularly characterized by exhibiting a lower cache miss ratio in operation.

It is a more specific object of this invention to provide a cache memory for adaptively selectively enabling circuitry for effectively predicting operand cache misses not only during an "in-rush" period following a process change but also in other operating conditions in which it would be advantageous to enable the cache miss prediction mechanism.

SUMMARY OF THE INVENTION

Briefly, these and other objects of the invention are achieved by special purpose apparatus which stores recent cache misses and searches for address patterns therein. Any detected pattern is then employed to anticipate a succeeding cache operand request miss by prefetching from main memory the block containing the predicted cache operand. The cache miss prediction mechanism is adaptively selectively enabled by an adaptive circuit that develops a short term operand cache hit ratio history and responds to ratio improving and ratio deteriorating trends by accordingly enabling and disabling the cache miss prediction mechanism.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DETAILED DESCRIPTION OF THE INVENTION

Figure 1:
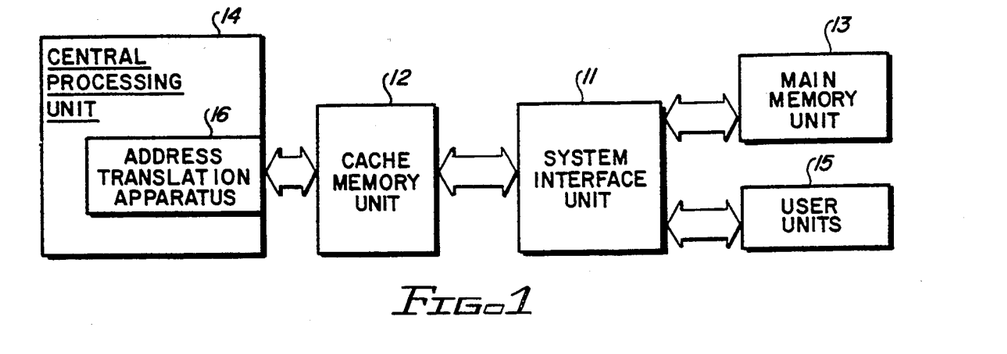
FIG. 1 is a generalized block diagram of a typical data processing system employing a cache memory and therefore constituting an exemplary environment for practicing the invention.

Referring now to FIG. 1, there is shown a high level block diagram for a data processing system incorporating a cache memory feature. Those skilled in the art will appreciate that this block diagram is only exemplary and that many variations on it are employed in practice. Its function is merely to provide a context for discussing the subject invention. Thus, the illustrative data processing system includes a main memory unit 13 which stores the data signal groups (i.e., information words, including instructions and operands) required by a central processing unit 14 to execute the desired procedures. Signal groups with an enhanced probability for requirement by the central processing unit 14 in the near term are transferred from the main memory unit 13 (or a user unit 15) through a system interface unit 11 to a cache memory unit 12. (Those skilled in the art will understand that, in some data processing system architectures, the signal groups are transferred over a system bus, thereby requiring an interface unit for each component interacting with the system bus.) The signal groups are stored in the cache memory unit 12 until requested by the central processing unit 14. To retrieve the correct signal group, address translation apparatus 16 is typically incorporated to convert a virtual address (used by the central processing unit 14 to identify the signal group to be fetched) to the real address used for that signal group by the remainder of the data processing system to identify the signal group.

The information stored transiently in the cache memory unit 12 may include both instructions and operands stored in separate sections or stored homogeneously. Preferably, in the practice of the present invention, instructions and operands are stored in separate (at least in the sense that they do not have commingled addresses) memory sections in the cache memory unit 12 inasmuch as it is intended to invoke the operation of the present invention as to operand information only.

The cache miss prediction mechanism which is a feature of the invention is based on recognizing and taking advantage of sensed patterns in cache misses resulting from operand calls. In an extremely elementary example, consider a sensed pattern in which three consecutive misses ABC are, in fact, successive operand addresses with D being the next successive address. This might take place, merely by way of example, in a data manipulation process calling for successively accessing successive rows in a single column of data. If this pattern is sensed, the likelihood that signal group D will also be accessed, and soon, is enhanced such that its prefetching into the cache memory unit 12 is in order.

Figure 2:
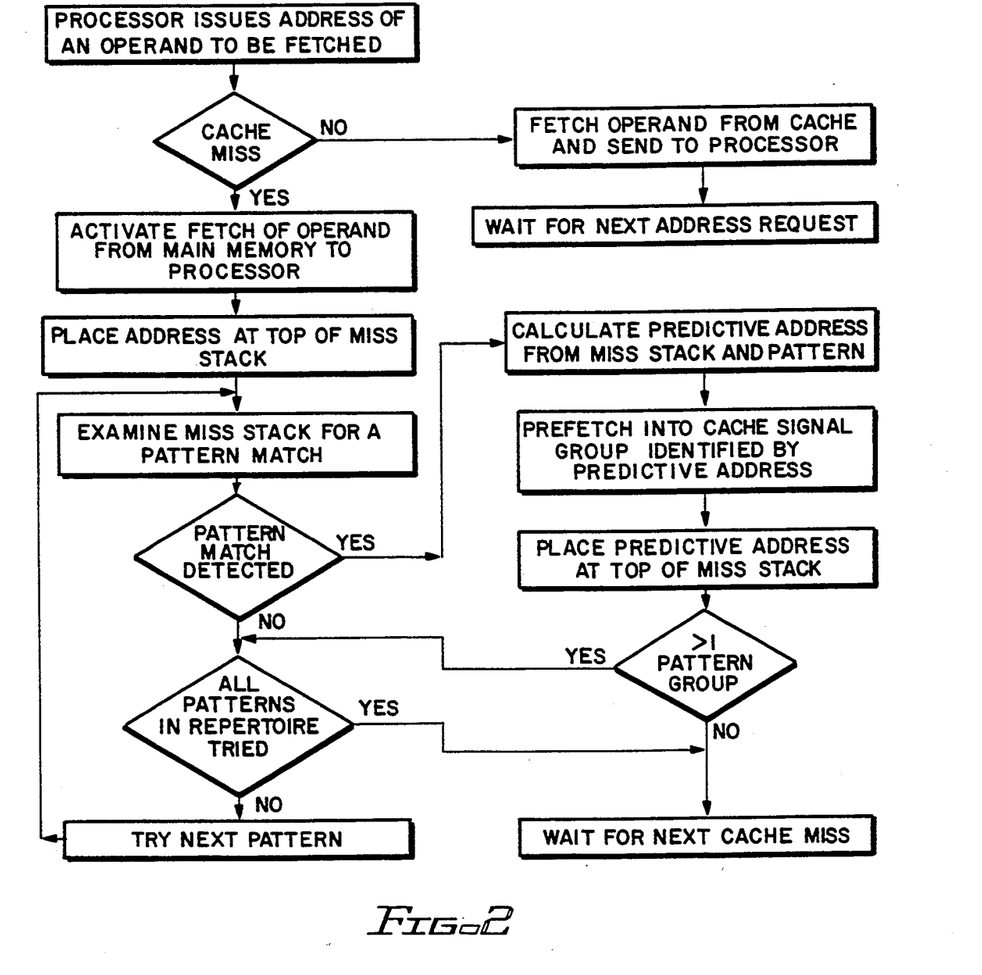
FIG. 2 is a flow diagram illustrating, in simplified form, the sequence of operations by which the address prediction feature of the invention is practiced.

The fundamental principles of the cache miss prediction mechanism are set forth in the operational flow chart of FIG. 2. When a processor (or other system unit) asks for an operand, a determination is made as to whether or not the operand is currently resident in the cache. If so, there is a cache hit (i.e., no cache miss), the operand is sent to the requesting system unit and the next operand request is awaited. However, if there is a cache miss, the request is, in effect, redirected to the (much slower) main memory.

Those skilled in the art will understand that the description to this point of FIG. 2 describes cache memory operation generally. In the context of the present invention, however, the address of the cache miss is meaningful. It is therefore placed at the top of a miss stack, which stack will be described in further detail below. The miss stack (which contains a history of the addresses of recent cache misses in consecutive order) is then examined to determine if a first of several patterns is present. This first pattern might be, merely by way of example, contiguous addresses for the recent cache misses. If the first pattern is not sensed, additional patterns are tried. Merely by way of example again, a second pattern might be recent cache misses calling for successive addresses situated two locations apart. So long as there is no pattern match, the process continues through the pattern repertoire. If there is no match when all patterns in the repertoire have been examined, the next cache miss is awaited to institute the process anew.

However, if a pattern in the repertoire is detected, a predictive address is calculated from the information in the miss stack and from the sensed pattern. This predictive address is then employed to prefetch from main memory into cache the signal group identified by the predictive address. In the elementary example previously given, if a pattern is sensed in which consecutive operand cache miss operand addresses ABC are consecutive and contiguous, the value of the predictive address, D, will be C+1.

In order to optimize the statistical integrity of the miss stack, the predictive address itself may be placed at the top of the stack since it would (highly probably) itself have been the subject of a cache miss if it had not been prefetched in accordance with the invention.

Since speed of operation is essential, the cache miss prediction mechanism may advantageously be embodied in a "hard wired" form (e.g., in a gate array) although firmware control is contemplated. Consider first a relatively simple hardwired implementation shown in FIG. 3. A miss stack 20 holds the sixteen most recent cache miss addresses, the oldest being identified as address P with entry onto the stack being made at the top. Four four-input electronic switches 21, 22, 23, 24 are driven in concert by a shift pattern signal via line 25 such that: in a first state, addresses A, B, C, D appear at the respective outputs of the switches; in a second state, addresses B, D, F, H appear at the outputs; in a third state, addresses C, F, I, L appear at the outputs; and in a fourth state, addresses D, H, L, P appear at the outputs. Subtraction circuits 26, 27, 28 are connected to receive as inputs the respective outputs of the electronic switches 21, 22, 23, 24 such that: the output from the subtraction circuit 26 is the output of the switch 21 minus the output of the switch 22; the output from the subtraction circuit 27 is the output of the switch 22 minus the output of the switch 23; and the output from the subtraction circuit 28 is the output of the switch 23 minus the output of the switch 24.

Figure 3:
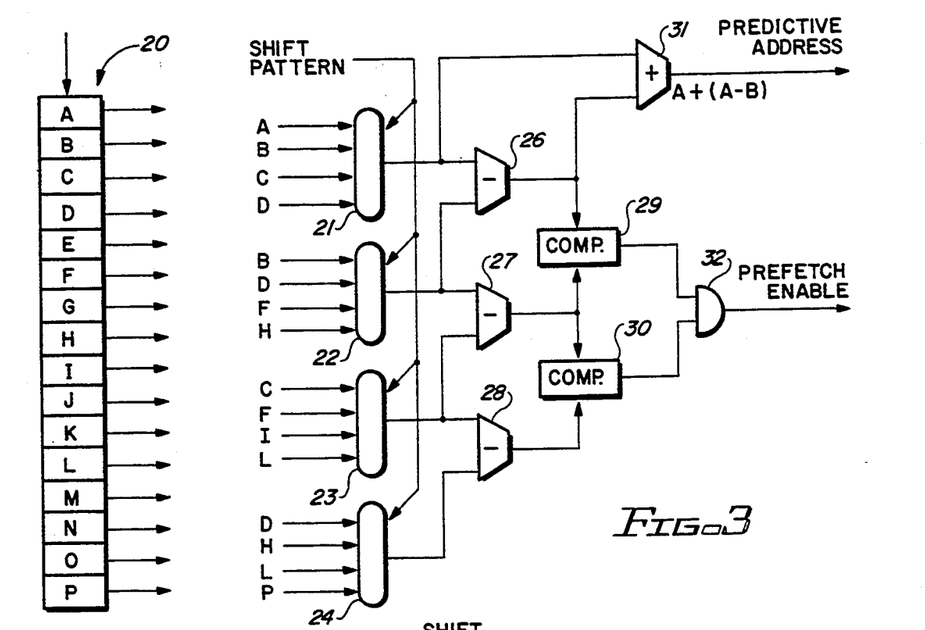
FIG. 3 is a logic diagram of a simple exemplary embodiment of the cache miss prediction mechanism.

The output from the subtraction circuit 26 is applied to one input of an adder circuit 31 which has its other input driven by the output of the electronic switch 21. In addition, the output from the subtraction circuit 26 is also applied to one input of a comparator circuit 29. The output from the subtraction circuit 27 is applied to the other input of the comparator circuit 29 and also to one input of another comparator circuit 30 which has its other input driven by the output of the subtraction circuit 28. The outputs from the comparator circuits 29, 30 are applied, respectively, to the two inputs of an AND-gate 32 which selectively issues a prefetch enable signal.

Consider now the operation of the circuit shown in FIG. 3. As previously noted, miss stack 20 holds the last sixteen cache miss addresses, address A being the most recent. When the request for the signal group identified by address A results in a cache miss, circuit operation is instituted to search for a pattern among the addresses resident in the miss stack. The electronic switches 21, 22, 23, 24 are at their first state such that address A is passed through to the output of switch 21, address B appears at the output of switch 22, address C appears at the output of switch 23 and address D appears at the output of switch 24. If the differences between A and B, B and C, and C and D are not all equal, not all the outputs from the subtraction circuits 26, 27, 28 will be equal such that one or both the comparator circuits 29, 30 will issue a no compare; and AND-gate 32 will not be enabled, thus indicating a "no pattern match found" condition.

The switches are then advanced to their second state in which addresses B, D, F, H appear at their respective outputs. Assume now that $(B-D)=(D-F)=(F-H)$; i.e., a sequential pattern has been sensed in the address displacements. Consequently, both the comparators 29, 30 will issue compare signals to fully enable the AND-gate 32 and produce a prefetch enable signal. Simultaneously, the output from the adder circuit 31 will be the predictive address $(B+(B-D))$. It will be seen that this predictive address extends the sensed pattern and thus increases the probability that the prefetched signal group will be requested by the processor, thereby lowering the cache miss ratio.

If a pattern had not have been sensed in the address combination BDFH, the electronic switches would have been advanced to their next state to examine the address combination CFIL and then on to the address combination DHLP if necessary. If no pattern was sensed, the circuit would await the next cache miss which will place a new entry at the top of the miss stack and push address P out the bottom of the stack before the pattern match search is again instituted.

Figure 4:
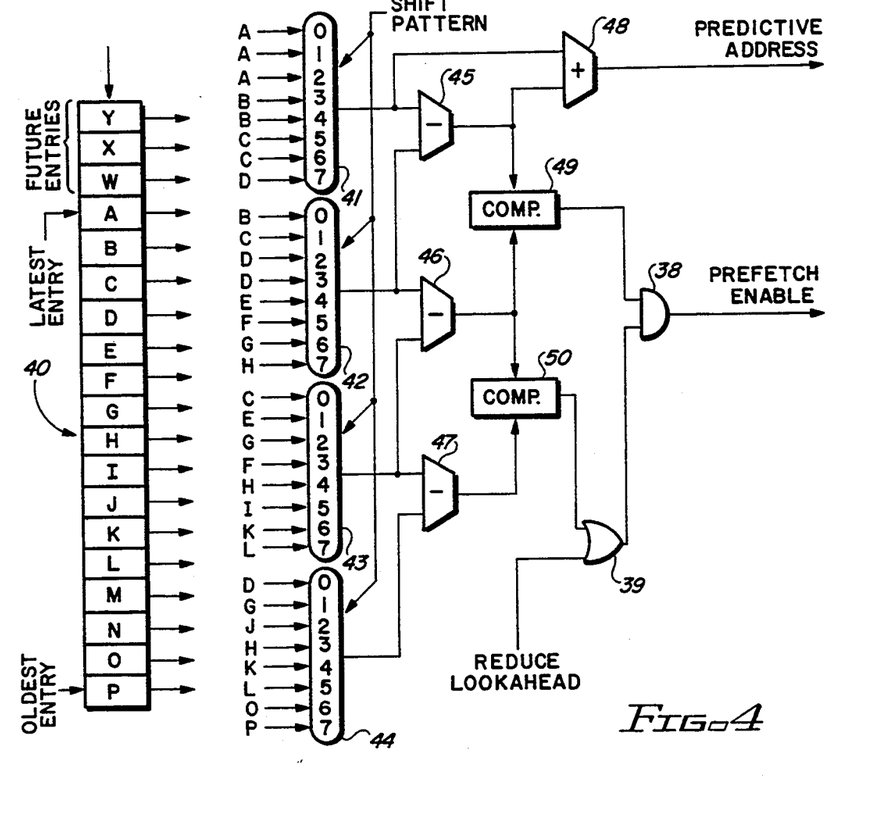
FIG. 4 is a logic diagram of a more powerful exemplary embodiment of the cache miss prediction mechanism.

Consider now the somewhat more complex and powerful embodiment of the cache miss prediction mechanism illustrated in FIG. 4. Electronic switches 41, 42, 43, 44 receive at their respective inputs recent cache miss addresses as stored in the miss stack 40 in the exemplary arrangement shown. It will be noted that each of the electronic switches 41, 42, 43, 44 has eight inputs which can be sequentially selectively transferred to the single outputs under the influence of the shift pattern signal. It will also be noted that the miss stack 40 stores, in addition to the sixteen latest cache miss addresses A-P, three future entries WXY. Subtraction circuits 45, 46, 47 perform the same office as the corresponding subtraction circuits 26, 27, 28 of the FIG. 3 embodiment previously described. Similarly, adder circuit 48 corresponds to the adder circuit 31 previously described.

Comparator circuit 49 receives the respective outputs of the subtraction circuits 45, 46, and its output is applied to one input of an AND-gate 38 which selectively issues the prefetch enable signal. Comparator circuit 50 receives the respective outputs of the subtraction circuits 46, 47, but, unlike its counterpart comparator 30 of the FIG. 3 embodiment, its output is applied to one input of an OR-gate 39 which has its other input driven by a reduce lookahead signal. The output of OR-gate 39 is coupled to the other input of AND-gate 38. With this arrangement, activation of the reduce lookahead signal enables OR-Gate 39 and partially enables AND-gate 38. The effect of applying the reduce lookahead signal is to compare only the outputs of the subtraction circuits 45, 46 in the comparator circuit 49 such that a compare fully enables the AND-gate 38 to issue the prefetch enable signal. This mode of operation may be useful, for example, when the patterns seem to be changing every few cache misses, and it favors the most recent examples.

With the arrangement of FIG. 4, it is advantageous to try all the patterns within pattern groups (as represented by the "YES" response to the ">1 PATTERN GROUP?" query in the flow diagram of FIG. 2) even if there is a pattern match detected intermediate the process. This follows from the fact that more than one of the future entries WXY to the miss stack may be developed during a single pass through the pattern repertoire or even a subset of the pattern repertoire. With the specific implementation of FIG. 4 (which is only exemplary of many possible useful configurations), the following results are obtainable:

| SWITCH STATE | PATTERN | GOAL |
| --- | --- | --- |
| 0 | ABCD | W |
| 1 | ACEG | X |
| 2 | ADGJ | Y |
| 3 | BDFH | W |
| 4 | BEHK | X |
| 5 | CFIL | W |
| 6 | CGKO | X |
| 7 | DHLP | W |

The goal states are searched in groups by switch state; i.e.: Group 1 includes switch states 0, 1, 2 and could result in filling future entries WXY; Group 2 includes states 3, 4 and could result in filling entries WX; Group 3 includes states 5, 6 and could also result in filling entries WX; and Group 4 includes state 7 and could result in filling entry W. When a goal state is reached that has been predicted, the search is halted for the current cache miss; i.e., it would not be desirable to replace an already developed predictive address W with a different predictive address W.

Those skilled in the art will understand that the logic circuitry of FIGS. 3 and 4 is somewhat simplified since multiple binary digit information is presented as if it were single binary digit information. Thus, in practice, arrays of electronic switches, gates, etc. will actually be employed to handle the added dimension as may be necessary and entirely conventionally. Further, timing signals and logic for incorporating the cache miss prediction mechanism into a given data processing system environment will be those appropriate for that environment and will be the subject of straightforward logic design.

Figure 5:
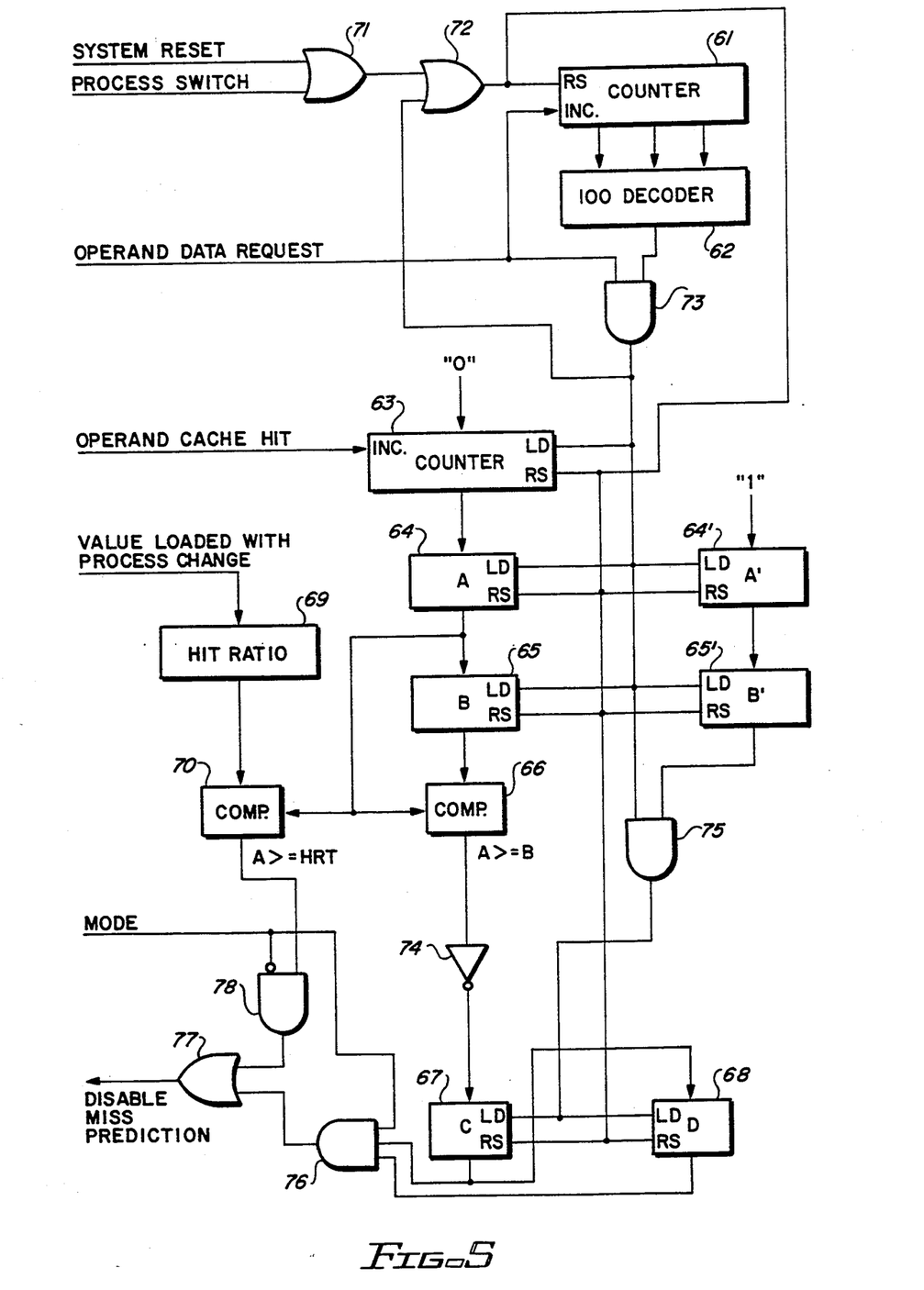
FIG. 5 is a logic diagram of an exemplary embodiment of the adaptive circuit for selectively enabling the cache miss prediction mechanism.

The foregoing discussion relates to the invention disclosed and claimed in the above-referenced U.S. Pat. No. 5,093,777 which forms an exemplary environment for the present invention. Attention is now directed to FIG. 5 which is a logic diagram of exemplary control apparatus for adaptively selectively enabling the cache prediction mechanism in accordance with the present invention.

An OR-gate 71 is driven by "system reset" and "process switch" signals, and its output drives one input to another Or-gate 72. The output of the OR-gate 72 serves to reset the counters 61, 63 and the registers 64, 64', 65, 65', 67 and 68 in the circuit. The counter 61 drives a 100 count decoder 62 whose output is coupled to one input of an AND-gate 73. The other input to the AND-gate 73 is driven by an "operand data request" signal which is also applied to an increment input of the counter 61. The output of the AND-gate 73 drives load inputs to the counter 63 and each of the registers 64, 64', 65 and 65' and to one input of AND-gate 75.

An "operand cache hit" signal drives an increment input to presettable counter 63 whose output is applied to the input of register 64. In addition, "0" logic signals are present at the data inputs to counter 63. The instantaneous count held in counter 63 is applied to the data inputs of register A 64. A one-bit register 64', which can be preset to "1", serves as a validity indicator for register 64. The instantaneous count held in register 64 is applied to the data inputs of register B 65, and a one-bit register 65' serves as a validity indicator for register 65. The state of one-bit register 65' is applied to the second input of AND-gate 75 which drives load inputs to one-bit registers 67 and 68.

The instantaneous counts in the registers 64 and 65 are applied to the inputs of a comparator 66 which issues a "1" output only when the count in register A 64 is equal to or greater than the count in register B 65. This output signal drives an inverter 74 which drives one-bit register C 67. The state of one-bit register 67 is applied to the input of one-bit register D 68 and also to one input of AND-gate 76. The state of one-bit register 68 is also applied to an input of AND-gate 76. Preferably, but not necessarily, AND-gate 76 has a third input driven by a "mode" signal which may be supplied by the process in execution.

Optional circuitry which may be employed includes hit ratio register 69 which may be loaded with a predetermined "hit ratio threshold" supplied by a new process. The value resident in the hit ratio register 69 is applied to one input of a comparator 70 which has its other input driven by the instantaneous count in register A 64 such that the comparator 70 issues a logic "1" only when A is greater than or equal to the hit ratio threshold. The output from comparator 70 is applied to one input of an AND-gate 78 which receives at its other input the logical inversion of the "mode" signal. The output from the AND-gates 76 and 78 are applied to the two inputs of an OR-gate 77 which issues a "disable miss prediction" signal when it is enabled.

Consider now the operation of the apparatus shown in FIG. 5. Either a "system reset" or a "process switch" will reset the counters 61, 63 and the registers 64, 64', 65, 65', 67 and 68 to initialize the adaptive circuitry. The counter 61 and the 100 decoder 62 cooperate to enable the AND-gate 73 every 100 times the "operand data request" signal increments the counter 61. This causes the counter 63 to load a count of zero as it passes along its just previous count to register A 64. Register 64 passes its previous count to register B 65. One-bit register A' 64' is loaded with a "1", and its previous state is passed to register B' 65'. That previous state will only be a "0" if a system reset or process switch took place just prior to the immediately previous count to 100 by the counter 61 took place.

The counter 63 is now incremented each time an operand cache hit takes place such that it accumulates, over the next 100 operand data requests, the short term cache hit ratio. In the meantime, comparator 66 compares the hit ratio now held in register A 64 to the ratio now held in register B 65 to determine if A is greater than or equal to B; i.e., if the most recent ratio is as good or better than the second most recent ratio. Hence, an upward (or flat) or downward trend is sensed.

If an upward trend is sensed, the output from the comparator 66 is a "1" which is inverted by the inverter 74 and applied as a logic "0" to the input of one-bit register C 67. This state will be loaded into the register 67 when the AND-gate 73 is next enabled if the state of the one-bit register B' 65' is "1"; i.e., if the AND-gate 75 is fully enabled. This would be the case two cycles following the occurrence of a system reset or process switch since the "1" applied to the one-bit register A' 64' would have flushed out the "0"s placed therein and in the one-bit register B' 65' by the OR-gate 72. Thus, it will be seen that the purpose of the registers 64' and 65' is to lock out invalid hit ratio information which would otherwise be generated immediately following a system reset or process switch.

When the state of the comparator 66, inverted through the inverter 74, is loaded into the one-bit register 67, the previous state of the register 67 is loaded into the one-bit register 68. As a result, if the hit ratio trend is down for two consecutive cycles such that the one-bit registers 67, 68 both contain "1"s, and assuming the "mode" signal is "1", then the AND-gate 76 is enabled to enable the OR-gate 77 which therefore issues the "disable miss prediction" signal. This signal remains until a subsequent comparison of the contents of the registers 64, 65 again indicates an upward (or flat) trend in the short term hit ratio.

The optional use of the "mode" signal permits selective overriding of the adaptive apparatus by establishing a predetermined hit ratio threshold at which, notwithstanding the presence of an upward trend in the hit ratio, the "disable miss prediction" signal is issued. This may be an appropriate operating procedure when it is known that a new process would not benefit from, or whose performance may be detrimentally affected by, the use of the adaptive circuit following cache "inrush". In the early stages of the execution of a new process, the new process switches the "mode" signal to "0" to partially enable the AND-gate 78 and to disable the AND-gate 76 to thereby lock out the decision section of the adaptive circuit and also causes the predetermined hit ratio to be loaded into the register 69. Under these conditions, a short term hit ratio is still being developed in the register A 64, and this hit ratio is compared to the hit ratio threshold held in the register 69 by the comparator 70. As long as the actual hit ratio is less than the hit ratio threshold, the comparator 70 output is "0". However, when the hit ratio reaches or exceeds the hit ratio threshold, the comparator 70 output switches to "1" to fully enable the AND-gate 78 to enable the OR-gate 77 which issues the "disable miss prediction" signal. It will be noted that, if the short term hit ratio again falls below the hit ratio threshold, the "disable miss prediction" signal will switch back to "0", thus permitting the cache miss prediction mechanism to resume operation.

While the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. An operand address prediction procedure for selectively predicting operand request addresses from historic cache miss addresses practiced in a data processing system incorporating a processor for running successive processes, a cache memory and a main memory, the procedure comprising the computer-implemented steps of:

during the system hardware, firmware and software design procedure, performing the preliminary step of:

A) establishing a first in, first out miss stack for storing a plurality of operand cache miss addresses by employing at least a selected one of hardware, firmware and software design and implementation techniques;

and, during system operation, performing the following steps within the system:

B) waiting for an operand cache miss resulting from the absence in the cache of called information requested of the cache;

C) when an operand cache miss occurs, placing the address of the called information onto the top of the miss stack;

D) selecting, from among a plurality of pattern groups comprising a pattern repertoire, a current pattern group;

E) examining the operand cache miss addresses resident in the miss stack for a match with a selected address pattern in the current pattern group;

F) if the selected pattern is not matched, determining if all the patterns in the current group have been examined;

G) if all the patterns in the current pattern group have not been examined, selecting, from the current pattern group, a different pattern than the pattern last examined and returning to step E);

H) if all the patterns in all the groups in the pattern repertoire have been searched, returning to step B);

I) if all the patterns in the current pattern group have been examined, assigning a new pattern group, different from the pattern group last examined, as the current group, selecting a pattern from the new current group and returning to step E); and J) if the selected pattern is matched:

1) using the matched pattern and at least one of the addresses in the miss stack to calculate a predictive address pointed to a signal group stored in the main memory;

2) prefetching into cache memory from the main memory the signal group identified by the predictive address; and 3) assigning another group as the current group and returning to step E);

wherein, concurrently with the performing of said steps B-J, the following steps are performed:

K) determining successive short term operand hit ratios of said cache memory;

L) comparing pairs of successive ratios determined in step K; and

M) generating la control signal when the ratios of said compared pairs represent a downward trend in said successively determined short term operand hit ratios and halting the performing of said steps B-J upon the occurrence of said control signal.

2. The system of claim 1 in which the operand address prediction procedure is disabled when a predetermined instantaneous cache hit ratio threshold is reached.

3. The system of claim 2 in which the predetermined cache hit ratio threshold is specified by a new process.

4. In a data processing system including a processor for running successive processes, a cache memory, a main memory and an operand address prediction mechanism for developing a predictive address for prefetching operands, each identified by an address, from the main memory into the cache memory, which operand address prediction mechanism comprises:

a first mechanism including:

A) a first in, first out stack for storing a plurality of addresses representing operand cache misses;

B) a plurality of electronic switch means each having a plurality of address inputs and a single address output;

C) means coupling said addresses stored in said stack individually to said electronic switch means inputs in predetermined orders;

D) means for switching said electronic switch means to transfer said addresses applied to said electronic switch means inputs to said electronic switch outputs to establish at said electronic switch outputs predetermined combinations of said addresses;

E) at least two subtraction circuit means, each said subtraction circuit means being coupled to receive a unique pair of addresses from said electronic switch means outputs and to issue a value representing the displacement therebetween;

F) at least one comparator circuit means coupled to receive a pair of outputs from a corresponding pair of said subtraction circuit means and responsive thereto for issuing a prefetch enable logic signal if there is a compare condition;

G) predictive address development means adapted to combine one of said addresses appearing at one of said electronic switch outputs and displacement information appearing at one of said subtraction circuit means to obtain a predictive address;

whereby, the coordinated presence of said predictive address and said prefetch enable logic signal causes a signal group identified by said predictive address to be prefetched from said main memory into said cache memory; and a control circuit coupled to said first mechanism and comprising:

means for generating numbers representing successive short term operand hit ratios of said cache memory, means for comparing pairs of successively generated ones of said numbers, and means for generating a control signal when the numbers of said compared pairs represent a downward trend in said short term operand hit ratios, the operation of said first mechanism being halted upon the occurrence of said control signal.

5. The system of claim 4 in which said first mechanism is disabled when a predetermined cache hit ratio threshold is reached.

6. The system of claim 5 in which said predetermined cache hit ratio threshold is specified by a new process.

7. An operand address prediction procedure for selectively predicting operand request addresses from historic operand cache misses practiced in a data processing system incorporating a processor for running successive processes, a cache memory, a main memory and a data stack, said procedure comprising the computer-implemented steps of:

A) waiting for an operand cache miss resulting from the absence in the cache of a called operand requested of said cache memory;

B) when an operand cache miss occurs, entering the address of the called operand on the top of said stack;

C) examining said stack for an address pattern among the operand miss addresses resident therein following step B);

D) if a pattern is not matched, returning to step A; and

E) if a pattern is matched:
1) using the matched pattern and at least one of the addresses in said stack to calculate a predictive address pointing to a signal group stored in said main memory;
2) prefetching into said cache memory from said main memory the signal group pointed to by said predictive address; and
3) returning to step A);

wherein, concurrently with the performing of said steps A-E, the following steps are performed:

F) determining successive short term operand hit ratios of said cache memory;

G) comparing pairs of successive ratios determined in step F; and

H) generating a control signal when the ratios of said compared pairs represent a downward trend in said successively determined short term operand hit ratios, the performing of said steps A-E being halted upon the occurrence of said control signal.

8. The procedure of claim 7, wherein said control signal also is generated when said short term operand hit ratio reaches a predetermined value.

9. The procedure of claim 8, wherein said predetermined value is determined by the process commencing execution following a process change.

10. The procedure of claim 7, wherein said procedure comprises the additional step preceding step A of:

during the design procedure for the system comprising said processor, cache memory, main memory and data stack, establishing said stack as a first in, first out stack for storing a plurality of said addresses of called operands; and performing steps A-H during system operation 11. The procedure of claim 7, wherein each of said short term operand hit ratios is determined by counting the number of operand cache hits occurring during an interval in which a predetermined number of operands are requested from said cache memory.

12. The method for predicting operand addresses of operand requests in a data processing system in which a cache thereof is repeatedly interrogated to determine whether an address corresponding to a request operand address is stored therein, which stored operand address corresponds to an operand also stored in said cache; wherein said data processing system includes a main memory and a stack for holding addresses; said method being carried out by said data processing system in operating said cache, characterized by the computer-implemented steps of:

A) upon the occurence of a cache miss when an operand is requested from said cache, entering the request operand address into said stack;

B) examining the request operand addresses present in said stack to determine whether one of a plurality of predetermined operand address patterns is represented by said request operand addresses; and C) (1) if no one of said patterns is determined to be represented in step (B), returning to step (A), but
(2) (i) if one of said patterns is determined to be represented in step (B), generating an operand address of a predicted operand request,
(ii) using said generated operand address to obtain an operand from said main memory and write such operand into said cache, and
(iii) returning to step (A), wherein, concurrently with the performing of steps A-C, the following steps are performed:

D) determining successive short term operand hit ratios of said cache memory;

E) comparing pairs of successive ratios determined in step D; and

F) generating a control signal when the ratios of said compared pairs represent a downward trend in said successively determined short term operand hit ratios, the performing of said steps A-C being halted upon the occurrence of said control signal.

13. The method of claim 12, further characterized by:
in step C(2), said operand address is generated by performing a calculation using said one of said patterns and one of said request operand addresses present in said stack.

14. The method of claim 13, wherein said stack is a first in-first out stack, further characterized by:
in step (A), said request operand address is entered on the top of said stack.

15. Apparatus for controllably generating a predicted operand address of an operand request in a data processing system in which a cache thereof is repeatedly interrogated to determine whether an address corresponding to a request operand address is stored therein, which stored operand address corresponds to an operand also stored in said cache; wherein said data processing system includes a store for holding a plurality of said addresses in respective cells thereof; said apparatus being characterized by:

a controllable operand address prediction mechanism comprising:

a plurality of switches, each of said switches having a plurality of input terminals, an output terminal and a control terminal, whereby a control signal applied to said control terminal causes said switch to couple one of said input terminals to said output terminal; said control signal being delivered to said control terminals to cause the input terminals of said switches to be successively coupled to said output terminals;

a circuit coupling each of said input terminals of said switches to one of said cells;

a plurality of first arithmetic circuits, each of said first arithmetic circuits having a pair of input terminals and an output terminal, the input terminals of each of said first arithmetic circuits being coupled to the respective output terminals of two of said switches, each of said first arithmetic circuits performing an arithmetic operation on the two addresses received by its input terminals from the two cells of said store coupled to said input terminals by said two switches and delivering a signal at its output terminal which represents the result of said arithmetic operation;

a plurality of comparators, each of said comparators having a pair of input terminals and an output terminal, the input terminals of each of said comparators being coupled to the respective output terminals of two of said first arithmetic circuits, each of said comparators comparing the two arithmetic result signals received thereby and delivering a signal at its output terminal denoting whether said result signals are alike;

a second arithmetic circuit having a pair of input terminals and an output terminal, a first input terminal of said second arithmetic circuit being coupled to the output terminal of one of said switches and the second input terminal of said second arithmetic circuit being coupled to the output terminal of one of said first arithmetic circuits, said second arithmetic circuit performing an arithmetic operation on the address received by said first input terminal and the arithmetic result represented by the signal received by said second input terminal and delivering an output signal at its output terminal which represents the result of said arithmetic operation performed by said second arithmetic circuit;

whereby when the signals delivered at the output terminals of all of said comparators denote that the compared arithmetic results are alike, the arithmetic result represented by the concurrent output signal of said second arithmetic circuit represents said predicted operand request address; and a control circuit coupled to said prediction mechanism and comprising:

means for generating numbers representing successive short term operand hit ratios of said cache memory, means for comparing pairs of successively generated ones of said numbers, and means for generating a control signal when the numbers of said compared pairs represent a downward trend in said short term operand hit ratios wherein the operation of said prediction mechanism being halted upon the occurrence of said control signal.

16. The method for predicting operand addresses of operand requests in a data processing system in which a cache thereof is repeatedly interrogated to determine whether an operand address corresponding to a requested operand is stored therein, said cache storing operands and their corresponding operand addresses; wherein said data processing system includes a main memory; said method being carried out by said data processing system in operating said cache, characterized by the computer-implemented steps of:

A) upon the generation of and interrogation of said cache by a request operand address, B) determining whether a plurality of earlier-generated request operand addresses correspond to one of a plurality of predetermined operand address patterns, and C) (1) if no one of said patterns is determined to correspond to said plurality of request operand addresses in step (B), returning to step (A), but (2) (i) if one of said patterns is determined to correspond to said plurality of request operand addresses, generating an operand address of a predicted operand request using said one pattern, (ii) obtaining the operand from the main memory location represented by said predicted operand address and writing said operand into said cache, and (iii) returning to step (A), wherein, concurrently with the performing of steps A-C, the following steps are performed:

D) determining successive short term operand hit ratios of said cache memory;

E) comparing pairs of successive ratios determined in step D; and

F) generating a control signal when the ratios of said compared pairs represent a downward trend in said successively determined short term operand hit ratios, the performing of said steps A-C being halted upon the occurrence of said control signal.

17. The method of claim 16, wherein said control signal also is generated when said short term operand hit ratio reaches a predetermined value.

18. The method of claim 17, wherein said predetermined value is determined by the process commencing execution following a process change.

19. The method of claim 16, wherein each of said short term operand hit ratios is determined by counting the number of operand cache hits occurring during an interval in which a predetermined number of operands are requested from said cache memory.

* * * * *